United States Patent
Hsieh et al.

(10) Patent No.: US 7,912,128 B2
(45) Date of Patent: Mar. 22, 2011

(54) MOTION VECTOR ESTIMATION SYSTEM AND METHOD THEREOF

(75) Inventors: Cheng-Yu Hsieh, Yungho (TW); Jui-Lin Wang, Hsindian (TW); Wei-Min Chao, Chungli (TW)

(73) Assignee: Quanta Computer Inc., Tao Yuan Shien (TW)

( * ) Notice: Subject to any disclaimer, the term of this patent is extended or adjusted under 35 U.S.C. 154(b) by 1350 days.

(21) Appl. No.: 11/433,188

(22) Filed: May 11, 2006

(65) Prior Publication Data

US 2007/0053440 A1 Mar. 8, 2007

(30) Foreign Application Priority Data

Sep. 8, 2005 (TW) .............................. 94130821 A

(51) Int. Cl.
*H04N 7/12* (2006.01)
*H04N 11/02* (2006.01)
*H04N 11/04* (2006.01)
*H04B 1/66* (2006.01)

(52) U.S. Cl. ................................................. 375/240.16

(58) Field of Classification Search ........................ None
See application file for complete search history.

(56) References Cited

U.S. PATENT DOCUMENTS

| | | | | |
|---|---|---|---|---|
| 5,715,016 | A * | 2/1998 | Kobayashi et al. | 348/699 |
| 5,731,850 | A * | 3/1998 | Maturi et al. | 348/699 |
| 5,870,500 | A * | 2/1999 | Daoudi et al. | 382/236 |
| 5,949,486 | A * | 9/1999 | Ishihara et al. | 348/402.1 |

* cited by examiner

*Primary Examiner* — Nhon T Diep
(74) *Attorney, Agent, or Firm* — Thomas | Kayden

(57) ABSTRACT

The invention discloses a motion vector estimation system and the method thereof for estimating an output motion vector for a macroblock of a frame. The motion vector estimation system is capable of selectively horizontally shifting a search window corresponding to each macroblock, so as to improve reusability of pixel data from previous search window and reduce memory bandwidth.

12 Claims, 6 Drawing Sheets

| horizontal search range | | [-16, 15] | | [-16, 15] with the invention | | | [-32, 31] | |
|---|---|---|---|---|---|---|---|---|
| sequence name | size | bit-rate (kbps) | peak signal-to-noise ratio (psnr) | bit-rate (kbps) | peak signal-to-noise ratio (psnr) | bandwidth overhead | bit-rate (kbps) | peak signal-to-noise ratio (psnr) |
| Wendy | 720*576 | 3344.9 | 34.72 | 3114.5 | 34.67 | 0% | 3106 | 34.67 |
| Boat | 720*288 | 4457.7 | 32.56 | 3828.9 | 32.31 | 0.06% | 3810 | 32.31 |
| Noise | 640*480 | 1101.4 | 33.91 | 966.62 | 33.8 | 0.02% | 965.6 | 33.78 |
| vga_wrm | 640*480 | 1680.4 | 37.83 | 1498.9 | 37.84 | 0.14% | 1494 | 37.86 |
| Stefan | 352*288 | 2193.5 | 31.78 | 2080.9 | 31.9 | 0% | 2074 | 31.9 |
| Forman | 352*288 | 715.36 | 32.72 | 699.84 | 32.71 | 0% | 698.9 | 32.71 |
| Silent | 176*144 | 93.08 | 32.73 | 92.81 | 32.73 | 0% | 92.7 | 32.74 |

FIG. 6

MOTION VECTOR ESTIMATION SYSTEM AND METHOD THEREOF

BACKGROUND OF THE INVENTION

1. Field of the Invention

The invention relates to a motion vector estimation system and method thereof, and more particularly to a system and method thereof capable of reducing memory bandwidth and accurately estimating motion vector.

2. Description of the Prior Art

The motion vector estimation system is a most important part in the conventional video encoder. The motion vector estimation system requires not only a great deal of calculation but lots of memory bandwidth while pixel data is being read.

Referring to FIG. 1, FIG. 1 is a functional block diagram illustrating the conventional video encoder 10. The video encoder 10 includes a hardware accelerator 12 for estimating and calculating the motion and a central processing unit (CPU) 14 for dealing with other workload. To reduce the loading of the main bus 16, a buffer 18, namely search window, is used for caching pixel data from the main memory 20. Afterward, the hardware accelerator 12 retrieves the pixel data from the buffer 18 for subsequent operation. For a motion estimator with a search range of $[-r, r-1]$, the included number of pixels is $(2r+b)^2$, wherein a macroblock consists of b*b pixels. For example, if the search range is $[-32, 31]$ and the macroblock consists of 16*16 pixels, the motion estimator has to load a search window including 80*80 pixels; if the search range is reduced from $[-32, 31]$ to $[-16, 15]$, the search window only includes 48*48 pixels correspondingly. However, though a smaller search range is helpful to decrease complicated calculation and lower the required memory bandwidth, a larger search range is still necessary for some applications, such as high definition television (HDTV), so as to improve the image quality and the bit rate.

To improve the motion estimation, U.S. Pat. No. 6,078,618 (hereinafter '618 patent) has disclosed a system for estimating the offset of search window to expand the search range without enlarging the search window. However, the search window disclosed in '618 patent is irregular while it is being loaded, so that it will bring the bandwidth lots of loading.

Referring to FIGS. 2A through 2C, FIG. 2A is a schematic diagram illustrating the search window 22 corresponding to the macroblock n. FIG. 2B is a schematic diagram illustrating the search window 24 without offset corresponding to the macroblock m. FIG. 2C is a schematic diagram illustrating the search window 26 with horizontal offset $4b$ corresponding to the macroblock m. As shown in FIG. 2A, if the search window is set as $[-b, b-1]$, the search window 22 corresponding to the macroblock n includes $9b^2$ pixels (i.e. the slash area), wherein b is equal to the size of macroblock. As shown in FIG. 2B, if the search window 24 corresponding to the macroblock m has no offset, that is to say the macroblock m is at the center of the search window 24, $6b^2$ pixels (as the slash area with dotted line), which the search windows 24 and 26 overlap, have been loaded in, and then the motion estimator only needs to load in the remained $3b^2$ pixels (as the slash area with real line). However, if the search window is variable, the architecture shown in FIG. 2B will be failure. As shown in FIG. 2C, the search window 26 corresponding to the macroblock m has a horizontal offset $4b$, and the search windows 24 and 26 does not overlap. In another word, the motion estimator cannot reuse the pixel data of search window 22 stored previously, and $9b^2$ pixels of the search window 26 have to be loaded in again. In the aforementioned prior art, if the search window can be shifted by a variable offset, the reloaded data will bring the bandwidth lots of loading.

Therefore, the scope of the invention is to provide a motion vector estimation system and method thereof to solve the aforementioned problems.

SUMMARY OF THE INVENTION

The scope of the invention is to provide a motion vector estimation system and method thereof for estimating an output motion vector of a macroblock of a frame, so as to improve reusability of pixel data from previous search window and reduce memory bandwidth.

According to a preferred embodiment of the invention, the motion vector estimation system is used for estimating an output motion vector of a first macroblock of a first frame. The motion vector estimation system includes a motion vector prediction circuit, a search window offset detecting circuit, a search window memory, a motion vector detecting circuit, a first adder and a second adder.

In the aforementioned embodiment, the motion vector prediction circuit is used for generating a predicted horizontal motion vector and a predicted vertical motion vector. The search window offset detecting circuit is used for generating a shifted horizontal motion vector based on the predicted horizontal motion vector and a predetermined threshold. Afterward, the search window offset detecting circuit shifts a search window corresponding to the first macroblock of the first frame by the shifted horizontal motion vector, wherein the shifted search window includes a plurality of compared macroblocks. The search window memory is used for selectively storing the plurality of compared macroblocks of the shifted search window. The motion vector detecting circuit is used for selecting a reference macroblock from the plurality of compared macroblocks and outputting a compared horizontal motion vector and a compared vertical motion vector according to the reference macroblock and the first macroblock, wherein the difference between the first macroblock and the reference macroblock is minimum as compared with the difference between the first macroblock and other macroblock of the compared macroblocks. The first adder is used for adding the predicted horizontal motion vector, the shifted horizontal motion vector, and the compared horizontal motion vector to generate a horizontal component of the output motion vector of the first macroblock of the first frame. The second adder is used for adding the predicted vertical motion vector and the compared vertical motion vector to generate a vertical component of the output motion vector of the first macroblock of the first frame.

Accordingly, the search window corresponding to each macroblock will be selectively shifted by the motion vector estimation system of the invention, so as to improve reusability of pixel data from previous search window and reduce memory bandwidth.

The advantage and spirit of the invention may be understood by the following recitations together with the appended drawings.

BRIEF DESCRIPTION OF THE APPENDED DRAWINGS

FIG. 6 shows an experimental result based on the invention.

DETAILED DESCRIPTION OF THE INVENTION

Figure 1:
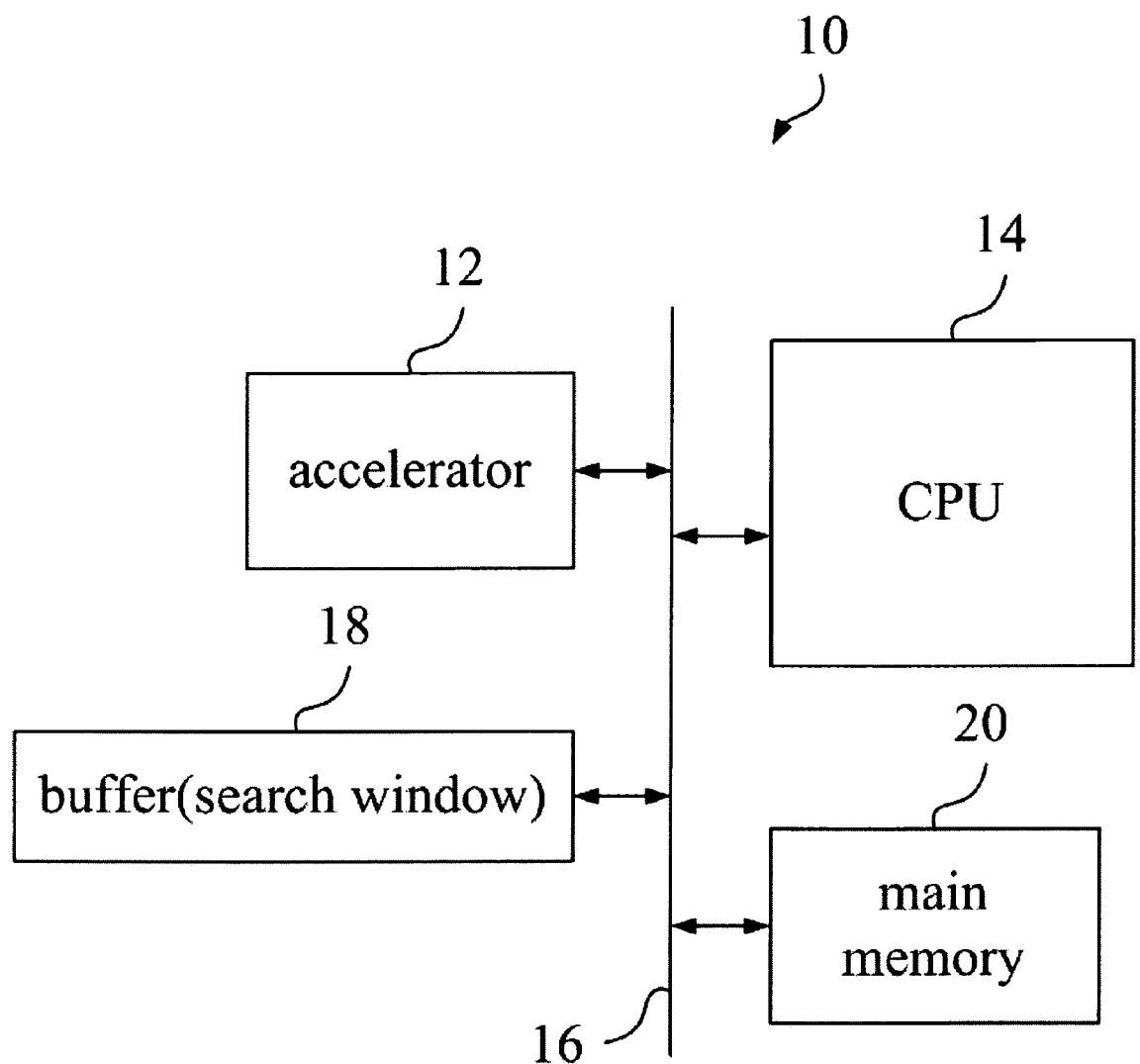
FIG. 1 is a functional block diagram illustrating the conventional video encoder.
Figure 2A:
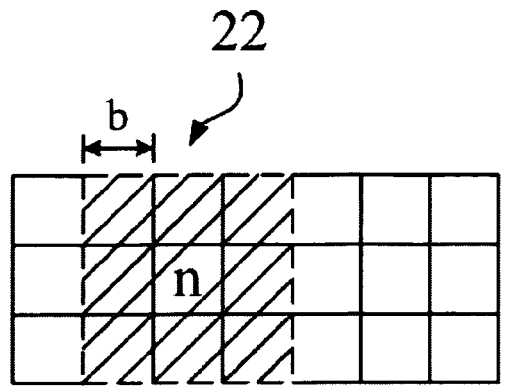
FIG. 2A is a schematic diagram illustrating the search window corresponding to the macroblock n.
Figure 2B:
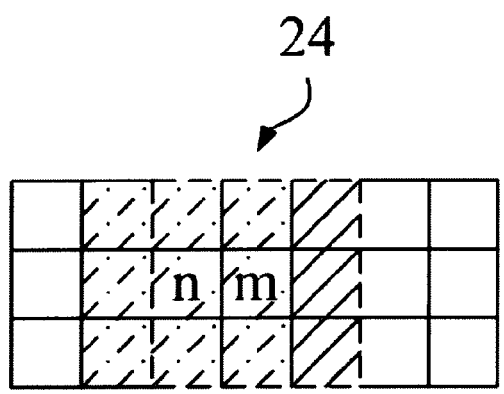
FIG. 2B is a schematic diagram illustrating the search window without offset corresponding to the macroblock m.
Figure 2C:
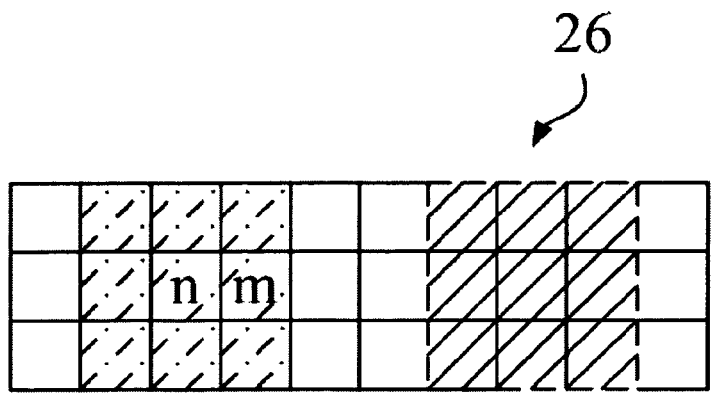
FIG. 2C is a schematic diagram illustrating the search window with horizontal offset 4b corresponding to the macroblock m.
Figure 3:
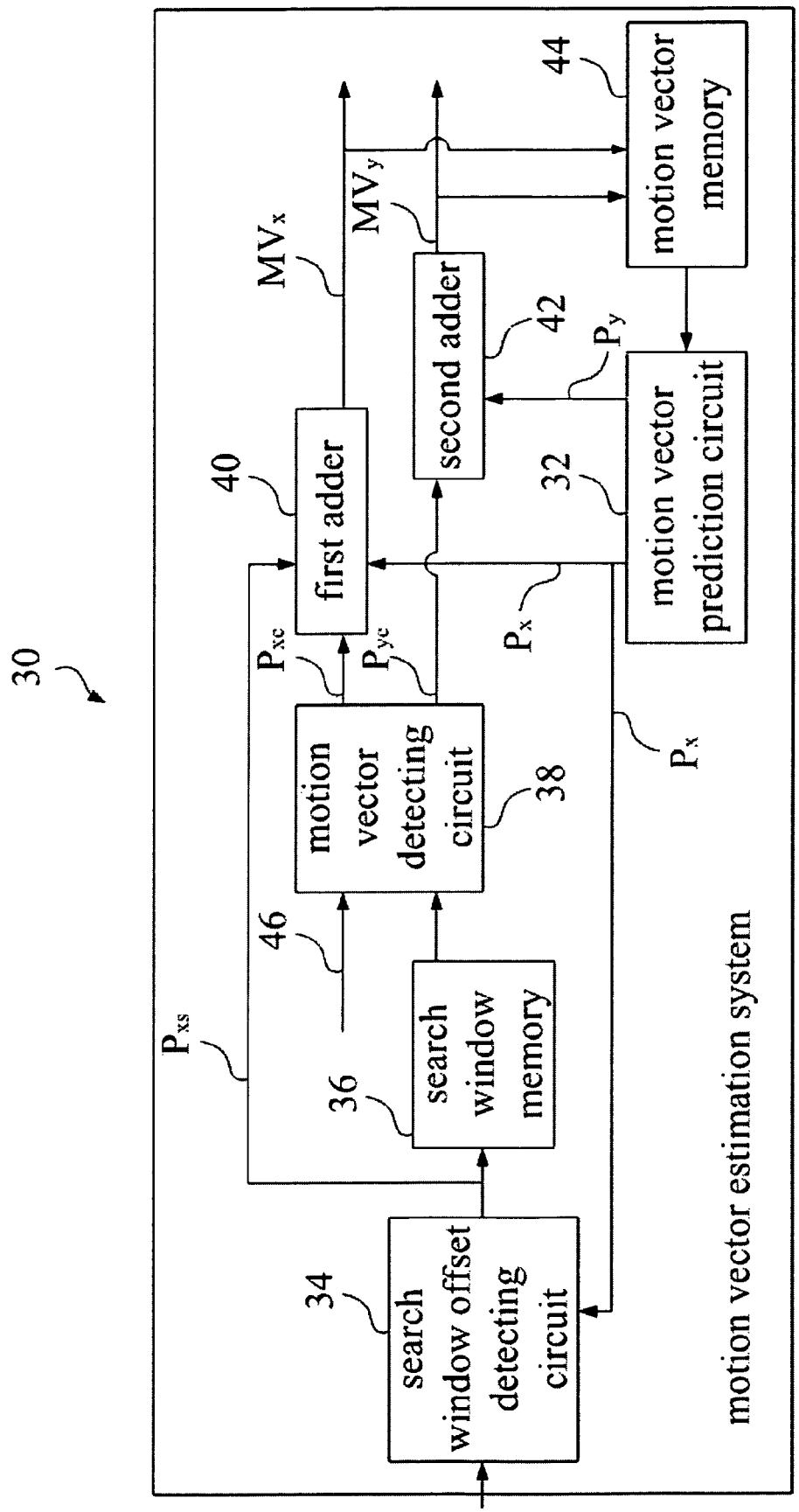
FIG. 3 is a functional block diagram illustrating the motion vector estimation system according to a first preferred embodiment of the invention.

Referring to FIG. 3, FIG. 3 is a functional block diagram illustrating the motion vector estimation system 30 according to a first preferred embodiment of the invention. The motion vector estimation system 30 includes a motion vector prediction circuit 32, a search window offset detecting circuit 34, a search window memory 36, a motion vector detecting circuit 38, a first adder 40, a second adder 42 and a motion vector memory 44. In this embodiment, the motion vector estimation system 30 is used for estimating an output motion vector of a first macroblock of a first frame 46. As shown in FIG. 3, the first frame 46 is inputted to the motion vector detecting circuit 38 via an input end.

In the aforementioned embodiment, the motion vector prediction circuit 32 is used for generating a predicted horizontal motion vector $P_x$ and a predicted vertical motion vector $P_y$. Based on the predicted horizontal motion vector $P_x$ and a predetermined threshold $P_{th}$, the search window offset detecting circuit 34 is used for generating a shifted horizontal motion vector $P_{xs}$ further shifting a search window corresponding to the first macroblock of the first frame 46 by the shifted horizontal motion vector $P_{xs}$, wherein the shifted search window includes a plurality of compared macroblocks. The search window memory 36 is coupled to the search window offset detecting circuit 34 and used for selectively storing the plurality of compared macroblocks of the shifted search window. The motion vector detecting circuit 38 is coupled to the search window memory 36 and used for selecting a reference macroblock from the plurality of compared macroblocks and outputting a compared horizontal motion vector $P_{xc}$ and a compared vertical motion vector $P_{yc}$ according to the reference macroblock and the first macroblock, wherein the difference between the first macroblock and the reference macroblock is minimum as compared with the difference between the first macroblock and other macroblock of the compared macroblocks. The first adder 40 is used for adding the predicted horizontal motion vector $P_x$, the shifted horizontal motion vector $P_{xs}$ and the compared horizontal motion vector $P_{xc}$ to generate a horizontal component $MV_x$ of the output motion vector of the first macroblock of the first frame 46. The second adder 42 is used for adding the predicted vertical motion vector $P_y$ and the compared vertical motion vector $P_{yc}$ to generate a vertical component $MV_y$ of the output motion vector of the first macroblock of the first frame 46. Finally, the motion vector estimation system 30 will combine the horizontal component $MV_x$ with the vertical component $MV_y$ to generate the output motion vector of the first macroblock. Furthermore, the motion vector memory 44 is used for storing the horizontal component $MV_x$ generated by the first adder 40 and the vertical component $MV_y$ generated by the second adder 42.

In the aforementioned embodiment, the value of the shifted horizontal motion vector $P_{xs}$ is selected from a group consisting of 0, a positive predefined constant, and a negative predefined constant, wherein the predefined constant is equal to the size of the first macroblock. For example, if the macroblock consists of 16*16 pixels, the predefined constant is set as 16. In this embodiment, it's assumed that r represents a predetermined search range. In another word, the search range of the search window is set as [−r, r−1]. If $P_x/r$ is larger than the predetermined threshold $P_{th}$ ($P_x/r > P_{th}$), the value of the shifted horizontal motion vector $P_{xs}$ is equal to the positive predefined constant. In another word, the search window offset detecting circuit 34 will right shift the search window of the first macroblock of the first frame 46 by the shifted horizontal motion vector $P_{xs}$. If $P_x/r$ is smaller than or equal to the negative value of the predetermined threshold $P_{th}$ ($P_x/r \leq -P_{th}$), the value of the shifted horizontal motion vector $P_{xs}$ is equal to the negative predefined constant. In another word, the search window offset detecting circuit 34 will left shift the search window of the first macroblock of the first frame 46 by the shifted horizontal motion vector $P_{xs}$. If $P_x/r$ is neither larger than the predetermined threshold nor smaller than or equal to the negative value of the predetermined threshold $P_{th}$ ($P_x/r \leq P_{th}$ or $P_x/r > -P_{th}$), the value of the shifted horizontal motion vector $P_{xs}$ is equal to 0. In another word, the search window offset detecting circuit 34 will not shift the search window of the first macroblock of the first frame 46.

According to the aforementioned motion vector estimation system 30, the search window may be right shifted with a macroblock, be left shifted with a macroblock, or not be shifted, so as to improve reusability of pixel data from previous search window and reduce memory bandwidth.

In the aforementioned embodiment, the predetermined threshold $P_{th}$ can be pre-stored in the search window offset detecting circuit 34 or other components based on practical use. In another preferred embodiment, the predetermined threshold $P_{th}$ can be set as but not limited to 0.5.

Figure 4:
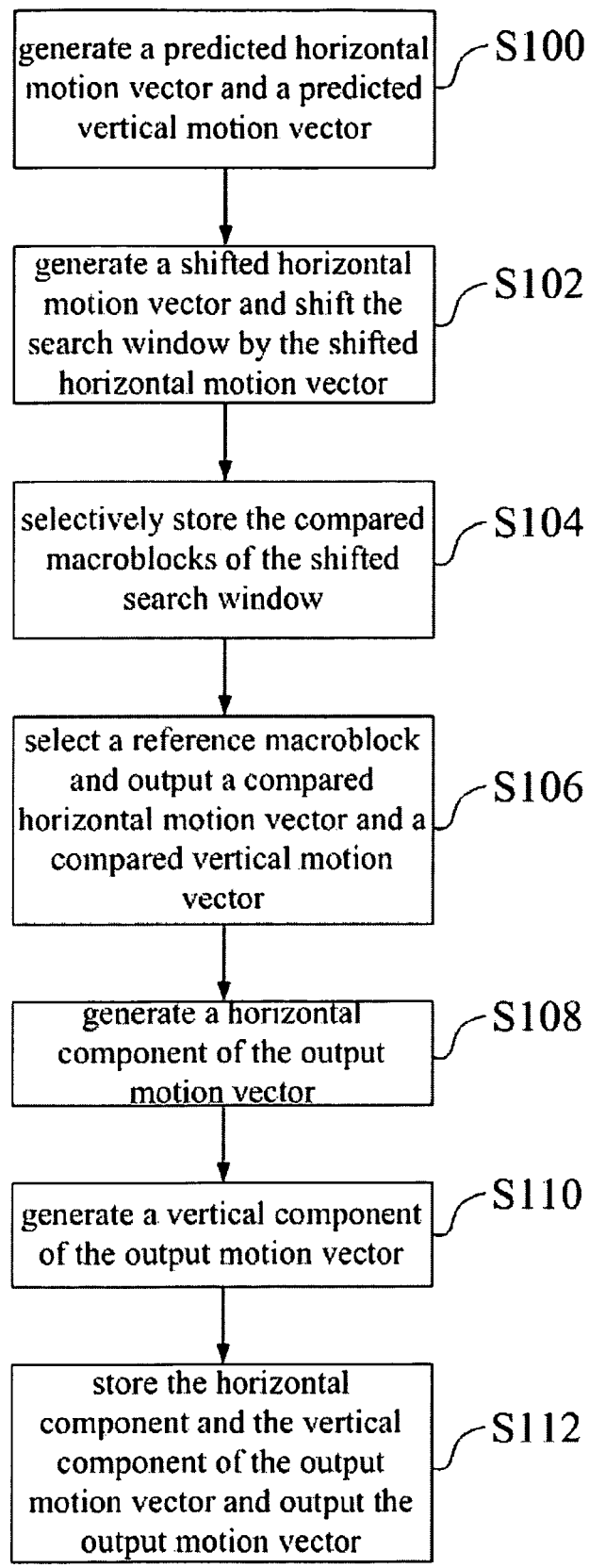
FIG. 4 is a flowchart showing the motion vector estimation method according to the first preferred embodiment of the invention.

Referring to FIG. 4, FIG. 4 is a flowchart showing the motion vector estimation method according to the first preferred embodiment of the invention. The motion vector estimation method includes the following steps. At start, step S100 is performed to generate a predicted horizontal motion vector $P_x$ and a predicted vertical motion vector $P_y$. Afterward, step S102 is performed to generate a shifted horizontal motion vector $P_{xs}$ based on the predicted horizontal motion vector $P_x$ and a predetermined threshold $P_{th}$ and shift a search window corresponding to the first macroblock of the first frame 46 by the shifted horizontal motion vector $P_{xs}$, wherein the shifted search window includes a plurality of compared macroblocks. The value of the shifted horizontal motion vector $P_{xs}$ is selected from a group consisting of 0, a positive predefined constant, and a negative predefined constant. Step S104 is then performed to selectively store the plurality of compared macroblocks of the shifted search window. Step S106 is then performed to select a reference macroblock from the plurality of compared macroblocks and output a compared horizontal motion vector $P_{xc}$ and a compared vertical motion vector $P_{yc}$ according to the reference macroblock and the first macroblock, wherein the difference between the first macroblock and the reference macroblock is minimum as compared with the difference between the first macroblock and other macroblock of the compared macroblocks. Step S108 is then performed to add the predicted horizontal motion vector $P_x$, the shifted horizontal motion vector $P_{xs}$ and the compared horizontal motion vector $P_{xc}$ to generate a horizontal component $MV_x$ of the output motion vector of the first macroblock of the first frame 46. Step 110 is then performed to add the predicted vertical motion vector $P_y$ and the compared vertical motion vector $P_{yc}$ to generate a vertical component $MV_y$ of the output motion vector of the first macroblock of the first frame 46. Finally, step S112 is performed to store the horizontal component $MV_x$ and the vertical component $MV_y$ of the output motion vector and output the output motion vector.

Figure 5:
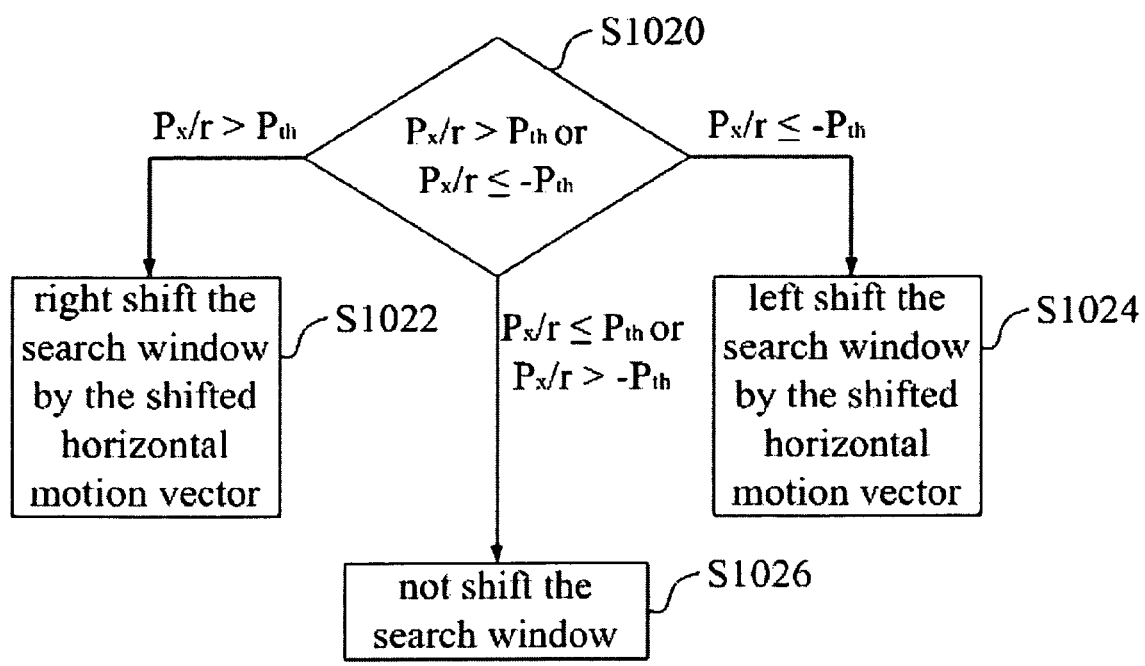
FIG. 5 is a flowchart showing the step S102 shown in FIG. 4 in detail.

Referring to FIG. 5, FIG. 5 is a flowchart showing the step S102 shown in FIG. 4 in detail. It's assumed that r represents a predetermined search range. In another word, the search range of the search window is set as [−r, r−1]. Step S102 further includes the following steps. Step S1020 is performed to determine if $P_x/r$ is larger than the predetermined threshold $P_{th}$ or smaller than or equal to the negative value of the predetermined threshold $P_{th}$. If $P_x/r > P_{th}$, step S1022 is then performed, if $P_x/r \leq -P_{th}$, step S1024 is then performed, otherwise step S1026 is then performed. Step S1022 is performed to set the value of the shifted horizontal motion vector $P_{xs}$ equal to the positive predefined constant and right shift the search window of the first macroblock of the first frame 46 by the shifted horizontal motion vector $P_{xs}$. Step S1024 is performed to set the value of the shifted horizontal motion vector $P_{xs}$ equal to the negative predefined constant and left shift the search window of the first macroblock of the first frame 46 by the shifted horizontal motion vector $P_{xs}$. Step S1026 is performed to set the value of the shifted horizontal motion vector $P_{xs}$ equal to 0 and not shift the search window of the first macroblock of the first frame 46.

Referring to FIG. 6, FIG. 6 shows an experimental result based on the invention. The bit-rate is a main performance metric. The search window is set as [−16, 15], and the macroblock consists of 16*16 pixels. FIG. 6 shows the experimental result after comparing the following three search methods: (A) [−16, 15]; (B) [−16, 15] with the motion vector estimation system and method thereof of the invention; (C) [−32, 31]. As show in FIG. 6, obviously, because the search window of (C) is the largest, the result of (C) is the best. On the other hand, the result of (B) is similar to that of (C). In another word, compared to (C), (B) almost needs no additional bandwidth. Accordingly, the motion vector estimation system and method thereof can effectively improve the efficiency.

Compared to the prior art, the motion vector estimation system of the invention will selectively shift or not shift the search window of each macroblock, so as to improve reusability of pixel data from previous search window and reduce memory bandwidth. Moreover, the architecture of the invention is simpler and the cost is lower than the prior art.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A motion vector estimation system for estimating an output motion vector of a first macroblock of a first frame, the motion vector estimation system comprising:
    a motion vector prediction circuit for generating a predicted horizontal motion vector and a predicted vertical motion vector;
        a search window offset detecting circuit for generating a shifted horizontal motion vector based on the predicted horizontal motion vector and a predetermined threshold, the search window offset detecting circuit further shifting a search window corresponding to the first macroblock of the first frame by the shifted horizontal motion vector, wherein the shifted search window comprises a plurality of compared macroblocks;
    a search window memory, coupled to the search window offset detecting circuit, for selectively storing the plurality of compared macroblocks of the shifted search window;
    a motion vector detecting circuit, coupled to the search window memory, for selecting a reference macroblock from the plurality of compared macroblocks and outputting a compared horizontal motion vector and a compared vertical motion vector according to the reference macroblock and the first macroblock, wherein the difference between the first macroblock and the reference macroblock is minimum as compared with the difference between the first macroblock and other macroblock of the compared macroblocks; and
    a first adder for adding the predicted horizontal motion vector, the shifted horizontal motion vector, and the compared horizontal motion vector to generate a horizontal component of the output motion vector of the first macroblock of the first frame.

2. The motion vector estimation system of claim 1, further comprising a second adder for adding the predicted vertical motion vector and the compared vertical motion vector to generate a vertical component of the output motion vector of the first macroblock of the first frame.

3. The motion vector estimation system of claim 2, further comprising a motion vector memory for storing the horizontal component and the vertical component of the output motion vector generated by the first adder and the second adder respectively.

4. The motion vector estimation system of claim 1, wherein the value of the shifted horizontal motion vector is selected from a group consisting of 0, a positive predefined constant, and a negative predefined constant.

5. The motion vector estimation system of claim 4, wherein the predefined constant is equal to the size of the first macroblock.

6. The motion vector estimation system of claim 5, wherein the value of the shifted horizontal motion vector is equal to the positive predefined constant if $P_x/r$ is larger than the predetermined threshold; the value of the shifted horizontal motion vector is equal to the negative predefined constant if $P_x/r$ is smaller than or equal to the negative value of the predetermined threshold; the value of the shifted horizontal motion vector is equal to 0 if $P_x/r$ is neither larger than the predetermined threshold nor smaller than or equal to the negative value of the predetermined threshold; wherein $P_x$ is the predicted horizontal motion vector and r represents a predetermined search range.

7. A motion vector estimation method for estimating an output motion vector of a first macroblock of a first frame, the motion vector estimation method comprising steps of:
    generating a predicted horizontal motion vector and a predicted vertical motion vector;
    generating a shifted horizontal motion vector based on the predicted horizontal motion vector and a predetermined threshold and shifting a search window corresponding to the first macroblock of the first frame by the shifted horizontal motion vector, wherein the shifted search window comprises a plurality of compared macroblocks;
    selectively storing the plurality of compared macroblocks of the shifted search window;
    selecting a reference macroblock from the plurality of compared macroblocks and outputting a compared horizontal motion vector and a compared vertical motion vector according to the reference macroblock and the first macroblock, wherein the difference between the first macroblock and the reference macroblock is minimum as compared with the difference between the first macroblock and other macroblock of the compared macroblocks; and adding the predicted horizontal motion vector, the shifted horizontal motion vector, and the compared horizontal motion vector to generate a horizontal component of the output motion vector of the first macroblock of the first frame.

8. The motion vector estimation method of claim 7, further comprising step of:

adding the predicted vertical motion vector and the compared vertical motion vector to generate a vertical component of the output motion vector of the first macroblock of the first frame.

9. The motion vector estimation method of claim 8, further comprising step of:

storing the horizontal component and the vertical component of the output motion vector.

10. The motion vector estimation system of claim 7, wherein the value of the shifted horizontal motion vector is selected from a group consisting of 0, a positive predefined constant, and a negative predefined constant.

11. The motion vector estimation system of claim 10, wherein the predefined constant is equal to the size of the first macroblock.

12. The motion vector estimation system of claim 11, wherein the value of the shifted horizontal motion vector is equal to the positive predefined constant if $P_x/r$ is larger than the predetermined threshold; the value of the shifted horizontal motion vector is equal to the negative predefined constant if $P_x/r$ is smaller than or equal to the negative value of the predetermined threshold; the value of the shifted horizontal motion vector is equal to 0 if $P_x/r$ is neither larger than the predetermined threshold nor smaller than or equal to the negative value of the predetermined threshold; wherein $P_x$ is the predicted horizontal motion vector and r represents a predetermined search range.

* * * * *